US012718395B2

(12) United States Patent
Lee

(10) Patent No.: US 12,718,395 B2
(45) Date of Patent: Aug. 25, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Jung Hyun Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 571 days.

(21) Appl. No.: 18/123,824

(22) Filed: Mar. 20, 2023

(65) Prior Publication Data

US 2024/0020868 A1 Jan. 18, 2024

(30) Foreign Application Priority Data

Jul. 18, 2022 (KR) ........................ 10-2022-0088125

(51) Int. Cl.
*G06T 7/70* (2017.01)
*B60R 11/04* (2006.01)
*G06T 7/80* (2017.01)

(52) U.S. Cl.
CPC ................ *G06T 7/70* (2017.01); *B60R 11/04* (2013.01); *G06T 7/80* (2017.01); *G06T 2207/30252* (2013.01)

(58) Field of Classification Search
CPC ... G06T 7/70; G06T 7/80; G06T 2207/30252; G06T 2207/10016; G06T 2207/20081;
(Continued)

(56) References Cited

U.S. PATENT DOCUMENTS 6,985,619 B1 * 1/2006 Seta ........................ H04N 13/25 348/E13.016
2013/0251194 A1 * 9/2013 Schamp .................... G06T 7/11 382/199

(Continued)

FOREIGN PATENT DOCUMENTS

CN 112097732 A 12/2020
JP 3503543 B2 3/2004

(Continued)

*Primary Examiner* — Andrew W Bee
*Assistant Examiner* — Devin J Dhooge
(74) *Attorney, Agent, or Firm* — Lempia Summerfield Katz LLC

(57) ABSTRACT

A vehicle includes a first camera to obtain a first image; a second camera to obtain a second image captured in a different field of view; and a controller to obtain a distance between the vehicle and an object by processing images obtained by the multiple cameras. The controller recognizes a first object in a frame of the image, obtains a height of, an aspect ratio of, and a distance from the first object, and assigns each to 3D coordinate values. The controller generates a 3D straight line based on a plurality of 3D coordinate values in each frame, stores a characteristic relationship between the recognized first object and the 3D straight line, obtains a height and aspect ratio of a second object by image processing upon recognizing the second object of the same model as the first object through the cameras, and estimates a distance from the second object based on the characteristic relationship.

14 Claims, 8 Drawing Sheets

(58) Field of Classification Search
CPC . G06T 2207/20084; G06T 2207/30261; G06T 7/536; B60R 11/04; G06V 20/56; G06V 20/58; B60W 50/06; B60W 40/02; B60W 40/107; B60W 2050/0083; B60W 2420/403; B60W 2520/105; B60W 2554/40; B60W 2554/802; H04N 23/61
See application file for complete search history.

(56) References Cited

U.S. PATENT DOCUMENTS

| | | | | |
|---|---|---|---|---|
| 2017/0010618 | A1* | 1/2017 | Shashua | G01C 21/3644 |
| 2019/0164301 | A1* | 5/2019 | Kim | G06T 19/20 |
| 2020/0026905 | A1 | 1/2020 | Karg et al. | |
| 2021/0103752 | A1 | 4/2021 | Umeda et al. | |
| 2021/0319588 | A1 | 10/2021 | Yuan et al. | |
| 2022/0277472 | A1* | 9/2022 | Birchfield | G06N 3/08 |
| 2022/0300001 | A1* | 9/2022 | Gayaka | G05D 1/0088 |
| 2023/0068798 | A1* | 3/2023 | Etchart | G06T 7/74 |

FOREIGN PATENT DOCUMENTS

| | | | |
|---|---|---|---|
| JP | 2007235951 | A | 9/2007 |
| JP | 2012198077 | A | 10/2012 |
| JP | 2017198710 | A | 11/2017 |
| JP | 2021060661 | A | 4/2021 |

* cited by examiner

VEHICLE AND METHOD OF CONTROLLING THE SAME

CROSS-REFERENCE TO RELATED APPLICATION

This application claims the benefit of priority to Korean Patent Application No. 10-2022-0088125, filed on Jul. 18, 2022 in the Korean Intellectual Property Office, the disclosure of which is incorporated herein by reference.

TECHNICAL FIELD

The present disclosure relates to a vehicle and a method of controlling the same, and more particularly to a vehicle with multiple cameras and a method of controlling the same.

BACKGROUND

A vehicle with an autonomous driving system or advanced driver assistance system (ADAS) is necessarily provided with multiple cameras and obtains information related to an object by recognizing the object through the cameras.

The multiple cameras mounted on the vehicle may be changed in a criterion for recognizing an object due to topographic features and when exposed to an external force. Therefore, an error may occur between an actual distance and a measured distance based on image processing. Due to the nature of the multi-cameras, a single object is likely to be recognized as multiple objects.

The vehicle may perform automated online calibration (AOC) to calibrate an error in a camera image due to external force. The vehicle may also perform vehicle dynamic compensation (VDC) to calibrate an error in a camera image due to the topographic features.

Meanwhile, the AOC and VDC depend on visual odometry (VO). Therefore, an error in a VO processing process may cause an error in distance measurement. Although there are no problems with VO processing, difficulty in recognizing a point on a road surface with which an object is in contact may cause an error in the distance measurement.

SUMMARY

An aspect of the disclosure is to provide a vehicle and a method of controlling the same, in which automated online calibration (AOC) and vehicle dynamic compensation (VDC) are performed without performing visual odometry (VO) that requires complex computation.

Additional aspects of the disclosure are set forth, in part, in the following description and, in part, should be apparent from the description or may be learned by practice of the disclosure.

In accordance with an embodiment of the disclosure, a vehicle with multiple cameras includes a first camera, a second camera, and a controller. The first camera is configured to obtain a first image and the second camera is configured to obtain a second image captured in a different field of view from the first camera. The controller is configured to obtain a distance between the vehicle and an object by processing images obtained by the multiple cameras. The controller is configured to: recognize a first object in a frame of the image, obtain a height of the first object, an aspect ratio of the first object, and a distance from the first object, and assign the height, the aspect ratio and the distance to 3D coordinate values. The controller is also configured to generate a 3D straight line based on a plurality of 3D coordinate values in each frame and store a characteristic relationship between the recognized first object and the 3D straight line in a memory. The controller is further configured to obtain a height of a second object and an aspect ratio of the second object by image processing, upon recognizing the second object of the same model as the first object through the multiple cameras, and to estimate a distance from the second object based on the characteristic relationship.

In accordance with an embodiment of the disclosure, the vehicle may further include an inertial measurement unit (IMU) configured to determine the posture and acceleration state of the vehicle. The controller may further be configured to determine the necessity for vehicle dynamic compensation (VDC) based on a frequency output from the IMU.

The controller may control the memory not to store the characteristic relationship for the first object, upon the frequency output from the IMU, when the magnitude of the frequency output is higher than or equal to a predetermined value.

The controller may control the memory to store the characteristic relationship for the first object, upon the frequency output from the IMU, when the magnitude of the frequency output is lower than a predetermined value.

The controller may determine the necessity for automated online calibration (AOC) based on a first characteristic relationship for the first object and a second characteristic relationship for the second object.

The controller may calculate a gradient varying between a gradient of a 3D straight line equation based on the first characteristic relationship and a gradient of a 3D straight line equation based on the second characteristic relationship and may determine the amount of calibration for the AOC based on the gradient variation.

When any one of the first camera or the second camera is turned in a yawing direction, the controller may correct the height of the first object based on a calibration result value stored in the memory and may store the characteristic relationship for the first object based on the corrected height.

The memory may store parallax information between the first camera and the second camera. The controller may recognize an object in the first image and an object in the second image as the same image, when the parallax information matches a difference between a 3D straight line of the object recognized in the first image and a 3D straight line of the object recognized in the second image.

In accordance with an embodiment of the disclosure, a method of controlling a vehicle with multiple cameras, including a first camera and a second camera, includes obtaining a first image through the first camera and obtaining a second image captured in a different field of view from the first camera through the second camera. The method also includes recognizing a first object in a frame of the image, obtaining a height of the first object, an aspect ratio of the first object, and a distance from the first object, and assigning the height, the aspect ratio and the distance to 3D coordinate values. The method further includes generating a 3D straight line based on a plurality of 3D coordinate values in each frame and storing a characteristic relationship between the recognized first object and the 3D straight line in a memory. The method also includes obtaining a height of a second object and an aspect ratio of the second object by image processing, upon recognizing the second object of the same model as the first object through the multi-cameras and includes estimating a distance from the second object based on the characteristic relationship.

In accordance with an embodiment of the disclosure, the method may further include determining a necessity for vehicle dynamic compensation (VDC) based on a frequency output from the IMU.

The determining of the necessity for the VDC may include controlling the memory not to store the characteristic relationship for the first object, upon the frequency output from the IMU, when the magnitude of the frequency output is higher than or equal to a predetermined value.

The determining of the necessity for the VDC may include controlling the memory to store the characteristic relationship for the first object, upon the frequency output from the IMU, when the magnitude of the frequency output is lower than a predetermined value.

In accordance with an embodiment of the disclosure, the method may further include determining a necessity for automated online calibration (AOC) based on a first characteristic relationship for the first object and a second characteristic relationship for the second object.

The determining of the necessity for the AOC may include calculating a gradient variation between a gradient of a 3D straight line equation based on the first characteristic relationship and a gradient of a 3D straight line equation based on the second characteristic relationship and may include determining the amount of calibration for the AOC based on the gradient variation.

When any one of the first camera or the second camera is turned in a yawing direction, the determining of the necessity for the AOC may include correcting the height of the first object based on a calibration result value stored in the memory and storing the characteristic relationship for the first object based on the corrected height.

In accordance with an embodiment of the disclosure, the method may further include recognizing an object in the first image and an object in the second image as the same image, when the parallax information matches a difference between a 3D straight line of the object recognized in the first image and a 3D straight line of the object recognized in the second image. The parallax information may include a geometrical relationship between the first camera and the second camera.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
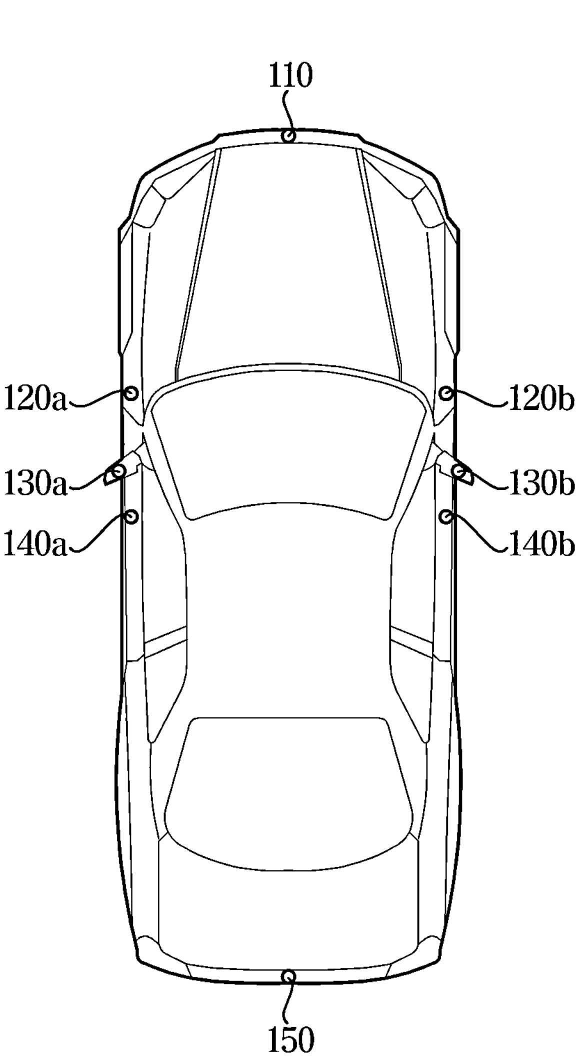
FIG. 1 illustrates a plurality of cameras arranged in a vehicle according to an embodiment.

Reference is made in detail to embodiments of the disclosure, examples of which are illustrated in the accompanying drawings, wherein like reference numerals refer to like elements throughout. This specification does not describe all elements of the disclosed embodiments and detailed descriptions of what is well known in the art. Redundant descriptions on substantially the same configurations have been omitted. The terms “part,” “module,” “member,” “block,” and the like, as used in the specification may be implemented in software or hardware. Further, a plurality of “part,” “module,” “member,” “block,” and the like, may be embodied as one component. It is also possible that one “part,” “module,” “member,” “block,” and the like, includes a plurality of components.

Throughout the specification, when an element is referred to as being “connected to” another element, it may be directly or indirectly connected to the other element, and the use of “indirectly connected to” includes being connected to the other element via a wireless communication network.

Also, it should be understood that the terms “include” and “have” are intended to indicate the existence of elements disclosed in the specification and are not intended to preclude the possibility that one or more other elements may exist or may be added.

Throughout the specification, when a member is located “on” another member, this includes not only when one member is in contact with another member but also when another member is present between the two members.

The terms “first,” “second,” and the like, are used to distinguish one component from another component. The component is not limited by the terms described above.

An expression used in the singular encompasses the expression of the plural unless it has a clearly different meaning in the context.

The reference numerals used in operations are used for descriptive convenience and are not intended to describe the order of operations and the operations may be performed in a different order unless otherwise stated.

Hereinafter, working principles and embodiments of the disclosure are described in detail with reference to the accompanying drawings. When a component, device, element, or the like, of the present disclosure is described as having a purpose or performing an operation, function, or the like, the component, device, or element should be considered herein as being “configured to” meet that purpose or to perform that operation or function.

Figure 2:
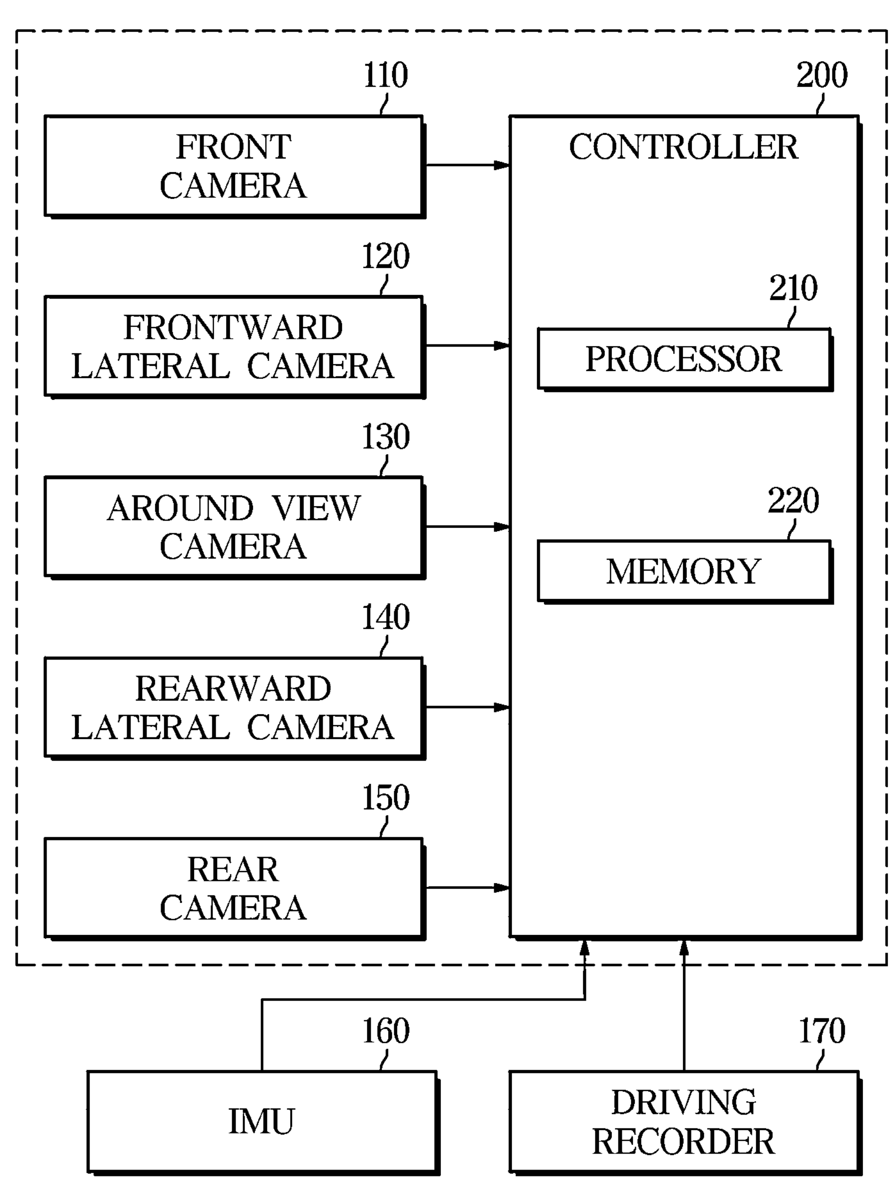
FIG. 2 is a control block diagram of a vehicle according to an embodiment.

FIG. 1 illustrates multiple cameras arranged in or on a vehicle according to an embodiment. FIG. 2 is a control block diagram of a vehicle according to an embodiment.

A vehicle 1 may assist a driver in controlling (e.g., driving, braking, and steering) the vehicle 1. For example, the vehicle 1 may detect objects or features in surrounding environments (e.g., other vehicles, pedestrians, cyclists, lanes, road signs, and the like). The vehicle 1 may also control the driving and/or the braking and/or the steering of the vehicle 1 in response to the detected environments. Below, an object includes other vehicles, cyclists, and like objects, which may collide with the traveling vehicle 1, in the surrounding environments.

The vehicle 1 may offer various functions to a driver. For example, the vehicle 1 may provide lane departure warning (LDW), lane keeping assist (LKA), high beam assist (HBA), autonomous emergency braking (AEB), traffic sign recognition (TSR), smart cruise control (SCC), blind spot detection (BSD), and the like to implement an autonomous driving system.

To provide various functions described above, the vehicle 1 may include a plurality, i.e., multiple cameras at various positions thereof as shown in FIG. 1. Although it is not shown in FIG. 1, the vehicle 1 may include radio detection and ranging (RADAR) and light detection and ranging (LIDAR) in addition to the cameras to perform the foregoing functions.

The vehicle 1 may include a front camera 110, frontward lateral cameras 120 (120*a*, 120*b*), around view or side view cameras 130 (130*a*, 130*b*), rearward lateral cameras 140 (140*a*, 140*b*), and a rear camera 150, thereby implementing multiple cameras.

The front camera 110 may be installed in the front windshield of the vehicle 1 to secure a field of view facing toward the front. The front camera 110 may capture the environment at the front of the vehicle 1 and obtain image data about the front of the vehicle 1. The front camera 110 may detect an object moving in a front field of view or detect an object traveling in an adjacent lane in a front side field of view. The image data about the front of the vehicle 1 may include location information about at least one of other vehicles, pedestrians, cyclists, lanes, curbstones, guardrails, street trees, streetlights, or the like located in front of the vehicle 1.

The frontward lateral cameras 120 (120*a*, 120*b*) may be installed in or on the frontward sides of the vehicle 1, such as an A pillar and a B pillar of the vehicle 1, to secure a field of view facing toward the frontward sides. The frontward lateral cameras 120 may capture the frontward sides of the vehicle 1 and obtain image data about the frontward sides of the vehicle 1.

The around view or side view cameras 130 (130*a*, 130*b*) may be installed in or on the side-view mirrors (not shown) of the vehicle 1 to secure a field of view facing toward the downward sides of the vehicle 1. The around view cameras 130 may capture the downward sides of the vehicle 1 and obtain image data about the downward sides of the vehicle 1.

The rearward lateral cameras 140 (140*a*, 140*b*) may be installed in or on the rearward sides of the vehicle 1, such as a C pillar of the vehicle 1, to secure a field of view facing toward the rearward sides of the vehicle 1. The rearward lateral cameras 140 may capture the rearward sides of the vehicle 1 and obtain image data about the rearward sides of the vehicle 1.

The rear camera 150 may be installed in or on the rear side of the vehicle 1, such as a rear bumper, to secure a field of view facing toward the rear of the vehicle 1. The rear camera 150 may capture the environment at the rear of the vehicle 1 and obtain image data about the rear of the vehicle 1.

Below, for convenience of description, at least two among the front camera 110, the frontward lateral cameras 120 (120*a*, 120*b*), the around view cameras 130 (130*a*, 130*b*), the rearward lateral cameras 140 (140*a*, 140*b*), and the rear camera 150 may be called the plurality of cameras, multiple cameras, multi-cameras, or the like. FIG. 1 shows a multi-camera system with eight cameras, but the multi-camera system may include four to eight cameras.

A controller 200 may acquire a plurality of camera images captured by the multiple cameras. The controller 200 may also generate a three-dimensional image based on a geometric relationship between the plurality of camera images. The controller 200 may obtain more physical information about an object from the plurality of camera images than from a camera image captured by a single camera.

The controller 200 may include an image signal processor, i.e., a processor 210 for processing the image data of the multiple cameras, and/or a micro control unit (MCU) for generating a braking signal, and/or the like.

While the autonomous driving system is performed, the controller 200 may identify objects in an image based on image information obtained by the front camera 110. The controller 200 may compare information about the identified objects with object information stored in a memory 220, thereby determining whether the objects in the image are stationary obstacles or moving obstacles.

The memory 220 may be configured to store programs and/or data for processing the image data, programs and/or data for processing radar data, and programs and/or data for allowing the processor 210 to generate a braking signal and/or a warning signal.

The memory 220 may be configured to temporarily store the image data received from the multi-cameras. The memory 220 may also temporarily store the results of processing the image data and/or the radar data of the memory 220.

When the processor 210 obtains data about the height and aspect ratio of an object and a distance from the object by processing images captured by the multi-cameras, the memory 220 may be configured to temporarily store a characteristic relationship, 3D coordinates values, a 3D linear equation, and/or the like as results of processing the data.

Further, the memory 220 may be configured to store parallax information, i.e., a geometric difference between the multi-cameras obtained during a camera calibration process performed before releasing the vehicle 1. The parallax information is based on positions between the cameras, which have been obtained and stored by offline camera calibration (OCC) before the release.

The memory 220 may be implemented as, but not limited to, at least one of nonvolatile memory devices such as a cache, a read-only memory (ROM), a programmable ROM (PROM), an erasable programmable ROM (EPROM), an electrically-erasable programmable ROM (EEPROM), or a flash memory, or volatile memory devices such as a random-access memory (RAM), or storage media such as a hard disk drive (HDD) or a compact-disc ROM (CD-ROM).

An inertial measurement unit (IMU) 160 may measure a frequency with a combination of a 3-axial accelerometer and a 3-axial gyro sensor, and determine the gradients of roll, pitch, and yaw based on the measured frequency, thereby determining the posture of the vehicle 1. Therefore, the vehicle 1 may determine the inclination, height, and the like, of the vehicle 1 according to the topographic features based on the frequency output from the IMU 160.

The controller 200 may receive information about the frequency varying in magnitude depending on the posture of the vehicle 1 from the IMU 160. The controller 200 may also detect a change in the posture of the vehicle 1 based on the magnitude of the frequency.

A driving recorder 170 refers to a device that obtains and provides the driving conditions or the like of the vehicle 1 to the controller 200. The driving recorder 170 records the movement amount, speed, revolutions per minute (RPM), and brake of the vehicle 1. The driving recorder 170 also records the location, direction, acceleration, travel distance, and/or the like, based on a global positioning system (GPS) in an electronic device.

To correct an error in distance measurement due to an external factor, the controller 200 may perform at least two processes.

First, to solve a measurement error due to the change in posture of the vehicle 1, the controller 200 may estimate the changed posture of the vehicle 1 based on a specific criterion (a road mark or lane), or may perform vehicle dynamic compensation (VDC) that estimates the changed posture by comparing the feature points of the successive camera images in the VO.

Second, to solve a measurement error due to the changed posture of the camera as an external impact is applied to the multi-cameras, the controller 200 may perform automated online calibration (AOC). The controller 200 may perform the AOC for the external force applied to the camera based on a comparison in epipolar geometry (EG) between the multi-cameras.

The controller 200 may receive the movement amount of the vehicle 1 from the driving recorder 170. The controller 200 may also obtain a region of interest (ROI) of a feature point in visual odometry (VO). However, according to the disclosure, the AOC and the VDC are performed based on the height and the aspect ratio of an object and the distance from the object, which are obtained by image processing, without depending on the foregoing VO, thereby estimating an actual distance between the vehicle 1 and the object.

Figure 3:
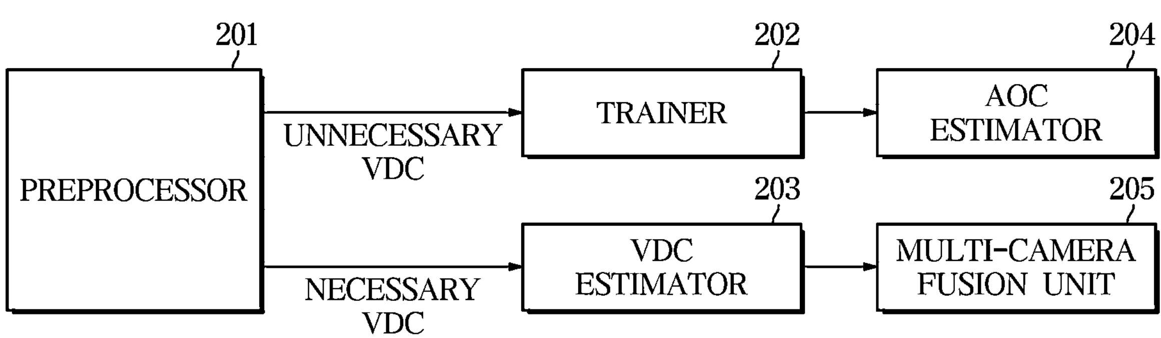
FIG. 3 is a functional block diagram of a controller according to an embodiment.

FIG. 3 is a functional block diagram of a controller according to an embodiment;

First, the VO for the VDC and AOC can be performed as many times as there are number of cameras. Because the VO requires a large computation volume, it may be difficult to process all the image data from the multi-cameras through a single processor. Further, the VDC or AOC may be performed even under normal conditions, thereby lowering the accuracy of distance measurement.

As described above, a problem with the computation volume arises when the VO for the VDC and AOC is performed with respect to all the cameras at a time. According to the disclosure, the VDC and the AOC are performed through each logic of the following elements.

A preprocessor 201 processes image data to estimate distance of the vehicle 1 and an object recognized by the multi-cameras. The preprocessor 201 may process the image data to obtain the height and aspect ratio of the object and the distance from the object.

The preprocessor 210 may use deep learning to identify the type of the object in the image processing process. For example, the preprocessor 201 obtains the aspect ratio of the object by identifying the vehicle model of the object captured in the image.

The preprocessor 210 may continuously track the recognized object and obtain the aspect ratio and height of the object.

Figure 5:
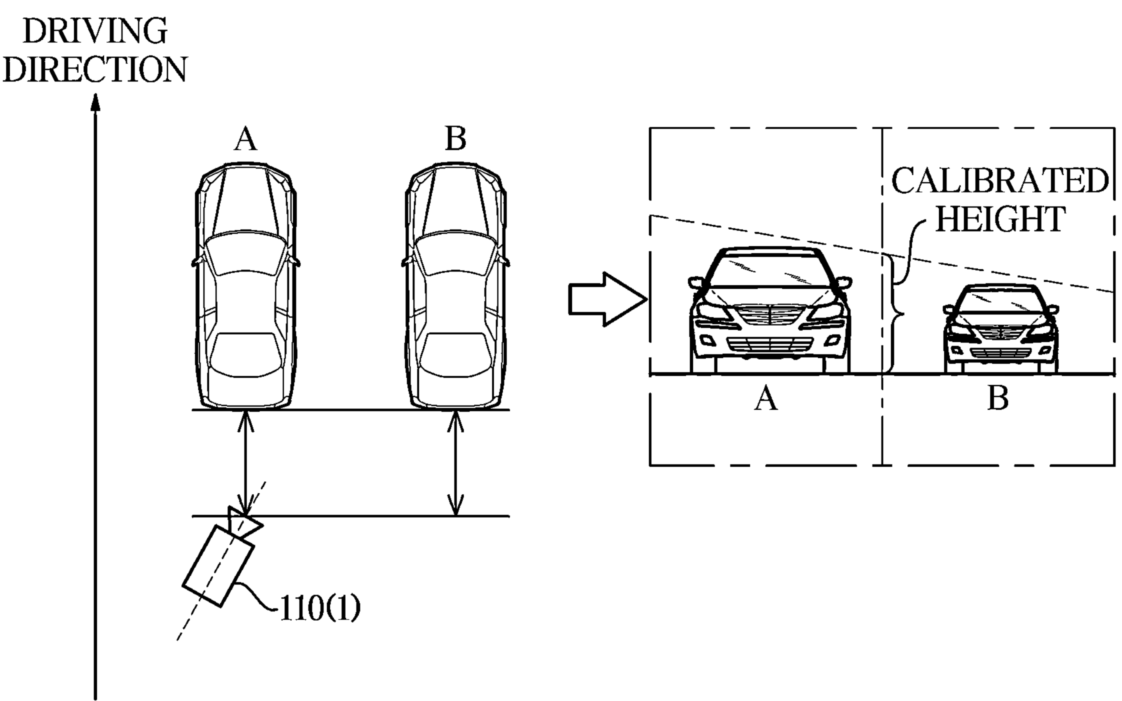
FIG. 5 illustrates a height calibration process due to yawing of a camera.

Meanwhile, the height of the object may be differently captured according to the orientations of the camera. Referring to FIG. 5, the front camera 110 of the vehicle 1 (i.e., 110(1) in FIG. 5) turned in a yawing direction captures a first object A and a second object B as if they are different in height from each other (see the right in FIG. 5) even though the first object A and the second object B are at the same distance. Due to the nature of the camera (e.g., a pinhole camera), a height difference in a traverse direction may be linear. Because of such linearity, the inclination based on the height difference is proportional to a yawing degree of the camera. Thus, it is possible to obtain the height of the object in consideration of the yawing degree based on the result of the calibration performed at the time of releasing the vehicle 1.

Taking the foregoing linearity and proportionality into account, the preprocessor 201 calibrates the height difference with respect to the length corresponding to the center of the image, thereby solving a deviation caused by the yawing of the camera.

The preprocessor 201 may recognize an object, continue to track the object, and correct the height of the object even while the camera yaws. The preprocessor 201 may estimate the distance from the object based on the height of the object.

Meanwhile, the foregoing process of the preprocessor 201 is based on the premise that there are no changes in the posture of the vehicle 1. When the posture of the vehicle 1 is changed due to topographic features, it is necessary to perform the VDC. The preprocessor 201 may determine whether the VDC is necessary, based on a signal received from the IMU 160. For example, the preprocessor 201 may determine that the vehicle 1 changes posture when a high frequency component is generated in the IMU 160. For example, the preprocessor 201 may determine that the VDC is necessary, when a high frequency is generated in a traversal acceleration signal, when a high frequency is generated in a velocity signal, when a high frequency is generated in a vertical acceleration signal, or a high frequency is generated in an angular velocity signal in a pitching direction.

The preprocessor 201 determines whether to perform learning about the height and aspect ratio of the object and the distance from the object based on the necessity of the VDC. When a change occurs in the posture of the vehicle 1, the preprocessor 201 may perform the learning after performing the VDC.

A trainer 202 may determine the data acquired by the preprocessor 201 as a learning data set when the VDC is unnecessary. The learning data set may include the height of the object, which is corrected considering that the camera is turned in the yawing direction, the aspect ratio of the object, and the distance from the object.

Figure 7:
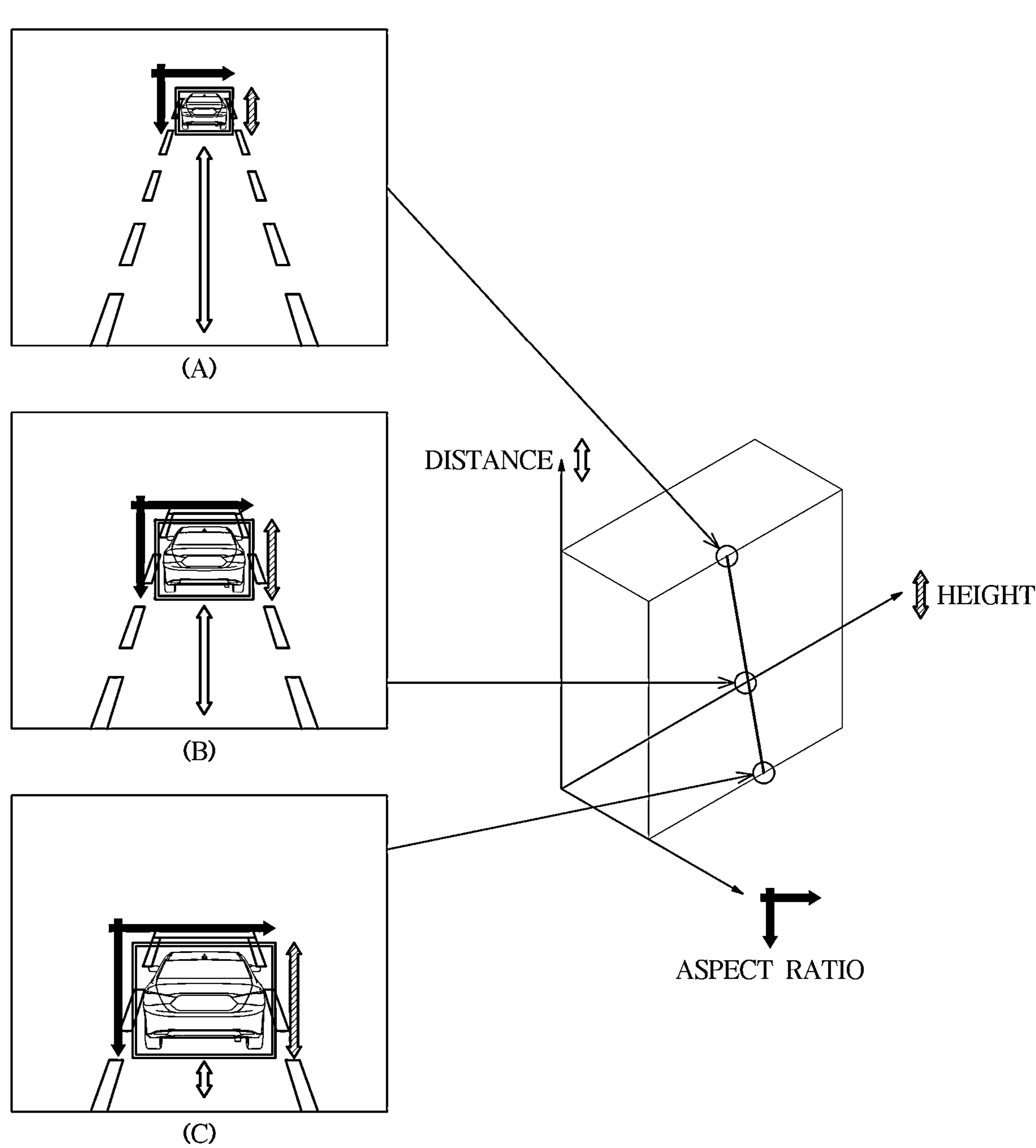
FIG. 7 illustrates 3D data of the same object.

To generate the learning data set, the trainer 202 may calculate the foregoing three values for each image frame according to time and generate coordinate points corresponding to three vehicle features in a 3D Euclidean space (see FIG. 7).

When not fewer than a predetermined number of coordinate points are accumulated corresponding to a plurality of frames, the trainer 202 may fit the coordinate points to a 3D straight line. Specifically, the trainer 202 may set a first axis for the height of the object, a second axis for the aspect ratio of the object, and a third axis for the distance from the object in the 3D coordinate system. In the 3D coordinate system, three components in one frame may be represented as one point, and those in many frames may be represented as a straight line. Because the overall widths and overall heights of vehicles are already determined according to vehicle models, the aspect ratio of the object, i.e., the component of the second axis may have a constant value. The straight line in the coordinate system has variable values except for the value of the second axis on the premise that the object is moving.

As a result, the trainer 202 may represent one object, i.e., a specific vehicle model as one 3D straight line.

In the 3D straight line output from the trainer 202, its height-distance slope may mean an angle between the camera and the road surface. Although the object is captured by different cameras, the height-distance slopes are similar.

When an external force is applied to the vehicle 1 and the camera is changed in the field of view, the high-distance slope derived by the trainer 202 may be biased. The bias slope may be regarded as a necessity for the AOC.

Therefore, an AOC estimator 204 may determine that the AOC is necessary when the slope of the 3D straight line is biased by a predetermined value or more.

If the posture of the camera is in an ideal state, the 3D coordinates for one object have a constant component value for the aspect ratio and a linear relationship between the height and the distance (see FIG. 7). The relationship between the height and the distance may be varied depending on a relative velocity and/or relative acceleration between the vehicle 1 and the object.

On the other hand, when the posture of the camera is changed by an external force, the aspect ratio and the linearity between the height-distance are maintained but the height-distance slope may be changed. When the height-distance slope is changed while generating the 3D straight line (fitting data) for a specific object, the AOC estimator 204 may determine that the camera's posture is changed, allowing the controller 200 to perform the AOC.

The AOC estimator 204 may calculate a gradient variation based on comparison between previously generated fitting data and subsequently generated fitting data, and the AOC may be performed based on the gradient variation. As the AOC estimator 204 performs the comparison between the fitting data, the AOC may be performed without depending on the VO. When the AOC is performed, the controller 200 updates the existing fitting data according to the changed posture of the camera and estimates the distance from the object.

In other words, when the AOC is necessary, the controller 200 calculates a difference in slope bias between the 3D straight lines before and after the AOC is necessary and calibrates the difference.

When the VDC is necessary, a VDC estimator 203 may calculate the height and the aspect ratio among the height and the aspect ratio of the object and the distance from the object and may estimate the distance from that object (or vehicle) based on the trained 3D straight line matching the calculated height and the aspect ratio. When the magnitude of the frequency acquired from the IMU 160 is higher than or equal to a predetermined value, the VDC estimator 203 determines that the VDC is necessary and estimates the distance from the object based on the 3D straight-line data without estimating the distance from the object directly from the image captured by the camera.

Even when the VDC is necessary, it is possible to calculate the height and the aspect ratio. Therefore, the VDC estimator 203 can estimate the distance from the object based on information about relationships between the height and the aspect ratio of the object and the distance from the object, which are acquired by the trainer 202. Eventually, the controller 200 can estimate the distance from the object based on the fitting data without depending on the VO regardless of whether the VDC is necessary.

Meanwhile, when an object is captured by different cameras, the shape and size of the object in an overlapping area are output differently due to parallax. Therefore, one object in the overlapping area may be output as different 3D straight lines according to cameras due to the parallax.

A multi-camera fusion unit 205 may estimate degrees of parallax between the multi-cameras and determine whether the 3D straight lines differ according to the multi-cameras being from the same object.

Geometrical information about the camera, which is obtained by camera calibration performed at the time of manufacturing the vehicle 1, may be stored in the memory 220. The multi-camera fusion unit 205 may determine the degrees of parallax between the multi-cameras based on the stored geometrical information.

Because the cameras are mounted at specific positions on the vehicle 1, the parallax is not changed unless the mounting postures of the cameras are changed.

Therefore, when the parallax between the multi-cameras is geometrically represented in a 3D space, it has the same shape as a geometrically represented difference between the fitting data acquired by the multi-cameras The information about the parallax between the vehicle 1 may be previously obtained by a calibration process at the time of releasing the vehicle 1. The memory 220 may store parallax data geometrically representing the parallax between the cameras in the 3D space.

For example, the controller 200 compares the parallax data between the front camera 110 and the frontward lateral camera 120 represented as the straight lines in the 3D space with the fitting data based on the images obtained by the front camera 110 and the frontward lateral camera 120. The controller 200 determines that an object in the image obtained by the front camera 110 and an object in the image obtained by the frontward lateral camera 120 are the object when the parallax data matches the fitting data in terms of a geometrical relationship.

When at least one camera is changed in the field of view by an external force or the like after the vehicle 1 is released, the change may be calibrated by the AOC.

Figure 4:
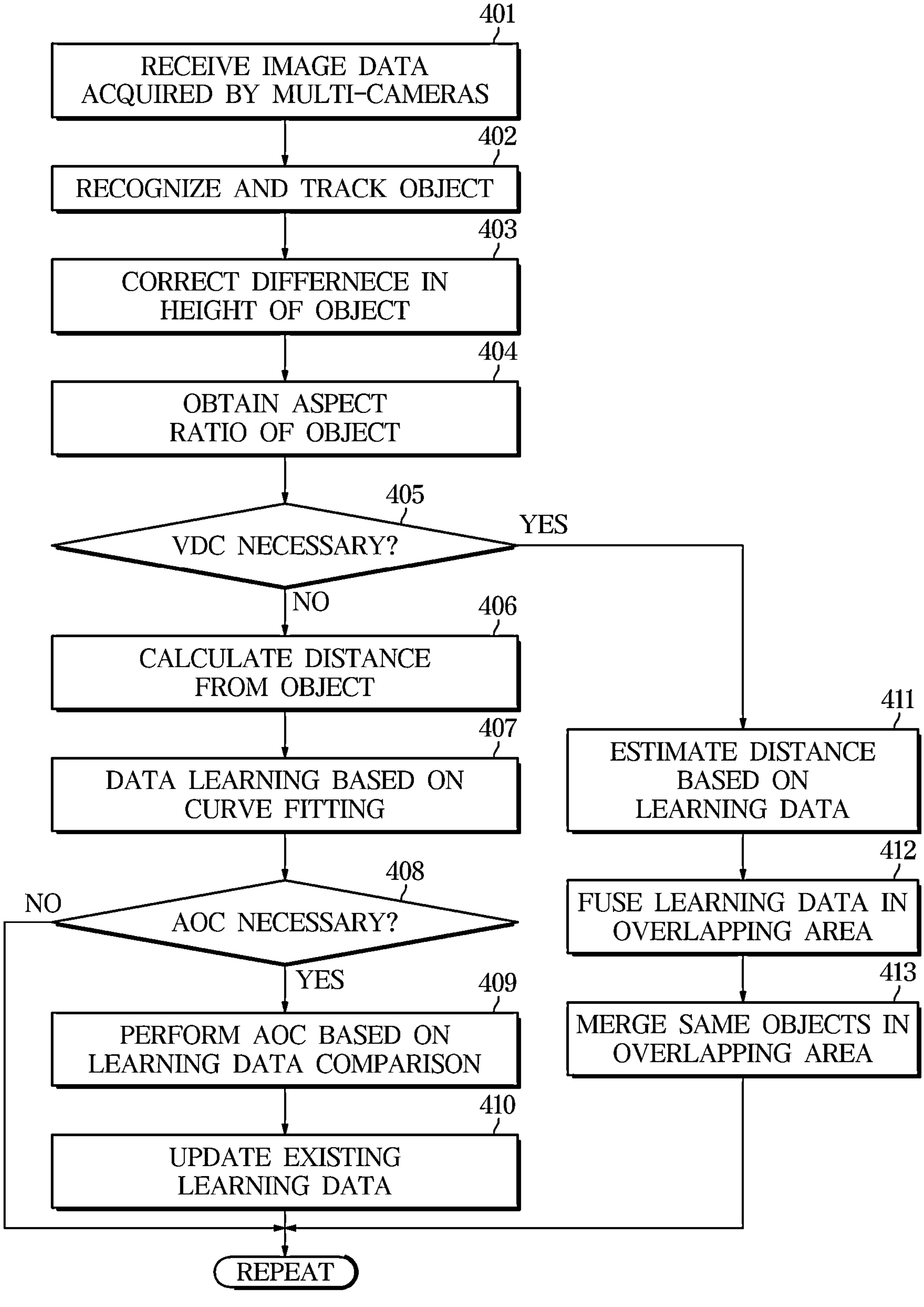
FIG. 4 is a flowchart showing a control method of a vehicle according to an embodiment.

FIG. 4 is a flowchart showing a control method of a vehicle according to an embodiment.

The controller 200 receives image data acquired by the multi-cameras (401).

The controller 200 recognizes an object by processing the image data and continues to track the object (402). The controller 200 may identify the object type by applying deep learning to the image processing process. For example, the controller 200 may identify the vehicle model of the object captured in the image and obtain the aspect ratio of the object.

The controller 200 corrects a difference in the height of the object (403). This operation is to calibrate a height error caused by the camera turned in the yawing direction and is based on linearity and proportionality.

The controller 200 obtains the aspect ratio of the object (404). The controller 200 may obtain the height of the object and the distance from the object in addition to the aspect ratio of the object to store such three components as learning data or may estimate the distance from the object based on the height and aspect ratio of the object among the three components of the previously stored learning data.

Specifically, the controller 200 recognizes an object in an image frame, obtains the height of the object, the aspect ratio of the object, and the distance from the object, and assigns the height, the aspect ratio, and the distance to the 3D coordinate system. The 3D straight line may be derived by accumulating the coordinate values of the object in the image frames. The relationships among the height, the aspect ratio, and the distance for each object are reflected in the 3D straight line. The controller 200 stores such relationships in the memory 220.

Thereafter, when the same vehicle model as the stored object is recognized during driving, the controller 200 may estimate the distance from the object based on the stored relationships. The controller 200 may determine the type of the object recognized during the driving through the deep learning process, obtain the height and aspect ratio of the object, and estimate the distance between the vehicle 1 and the recognized object based on the relationships.

When the VDC and the AOC are not necessary (405, 408), the controller 200 calculates the distance from the object (406) and applies the calculated distance to data learning based on curve fitting (407). The controller 200 may derive a straight line equation in the 3D space as a result of performing 3D straight line fitting. Here, the derived straight line equation is an equation having three coefficients (and intersections), and the three coefficients may be set as reference values for distinguishing between the objects. The controller 200 may perform 3D curve fitting by reflecting the state of the road surface in the data dependent on the 3D straight line while considering the unevenness of the road surface in an actual driving environment.

In other words, the controller 200 repeats the foregoing process while the vehicle 1 is traveling and accumulates learning data for estimating the distance between the vehicle 1 and the object.

On the other hand, when the VDC is necessary (405), the controller 200 may estimate the distance based on the learning data (411). The controller 200 determines an error in the distance from the object due to the posture change of the vehicle 1 or an external force and obtains an actual distance from the object.

Because the IMU 160 is used in determining whether the VDC is necessary, it is possible to determine the necessity of the VDC independently of the necessity of the AOC. The controller 200 fuses the learning data in the overlapping area (412) and merges the same objects in the overlapping area (413).

Meanwhile, the controller 200 may use the IMU 160 to determine the necessity of the VDC. When the VDC is necessary, the controller 200 determines that the obtained data is not suitable for the learning data and does not store characteristic relationships for the object. According to an embodiment, the controller 200 may not store the characteristic relationships for the object when the magnitude of the frequency acquired from the IMU 160 is higher than or equal to a predetermined value.

According to an embodiment, the controller 200 may store the characteristic relationships for the object when the magnitude of the frequency acquired from the IMU 160 is lower than a predetermined value.

When the AOC is necessary (408), the controller 200 performs the AOC based on comparison between the learning data (409). In addition, the controller 200 updates the existing learning data (410).

Specifically, the controller 200 may determine whether the AOC is necessary, based on a difference between the previously stored characteristic relationship for the object and the subsequently obtained characteristic relationship. It may be assumed that the former and latter objects are the same model, and therefore the 3D straight lines of both objects have the same slope. When the 3D straight lines are different in slope, it is determined that an external force is applied to the camera and the AOC is necessary. According to an embodiment, the controller 200 calculates a gradient variation between a gradient of a 3D straight line equation based on a first characteristic relationship and a gradient of a 3D straight line equation based on a second characteristic relationship and determines the amount of calibration for the AOC based on the gradient variation. Here, the first characteristic relationship is the previously stored 3D straight line equation of the object, and the second characteristic relationship is the 3D straight line equation of the object when the same model is recognized as a new object.

Figure 6:
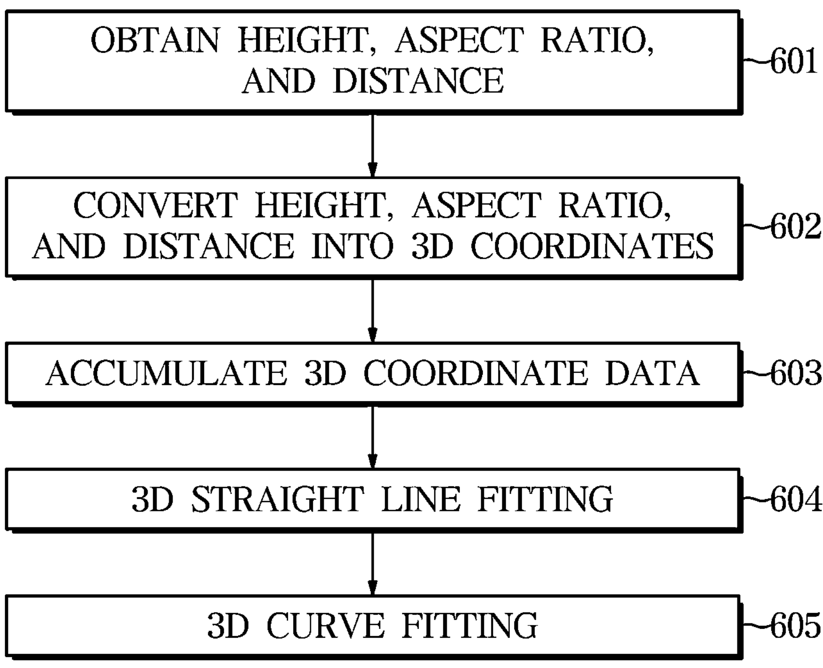
FIG. 6 is a detailed flowchart of data learning in FIG. 4.

FIG. 6 is a detailed flowchart of data learning in FIG. 4.

The controller 200 processes the images acquired by the multi-cameras and obtains the height and aspect ratio of the object and the distance from the object in the images (601).

The controller 200 converts the height, the aspect ratio, and the distance into coordinates in the 3D space (602). For example, the height of the object, the aspect ratio of the object, and the distance from the object in one frame (see (A) in FIG. 7) among the images acquired by the front camera 110 are digitized and assigned with coordinates for each frame in the 3D space.

The controller 200 accumulates coordinate data in the 3D space (603). By accumulating the coordinate points for successive frames, a straight line may be formed in the 3D space. In other words, the controller 200 may derive relationships among the height, the aspect ratio, and the distance from the straight line equation in the 3D space for three components such as the height, the aspect ratio, and the distance.

When the straight line is formed in the 3D space, the controller 200 performs 3D straight line fitting between that straight line and an object used in generating that straight line (604). Under the condition that an external force or a landform does not cause any problem, the same straight line data may be generated when the objects are the same vehicle model. That straight line data may be merged.

The controller 200 may derive the straight line equation in the 3D space as a result of performing the 3D straight line fitting. Here, the derived straight line equation is an equation having three coefficients, and the three coefficients may be set as reference values for distinguishing between the objects.

In addition, the controller 200 may perform 3D curve fitting by reflecting the state of the road surface in the data dependent on the 3D straight line while considering the unevenness of the road surface in an actual driving environment (605).

Figure 8:
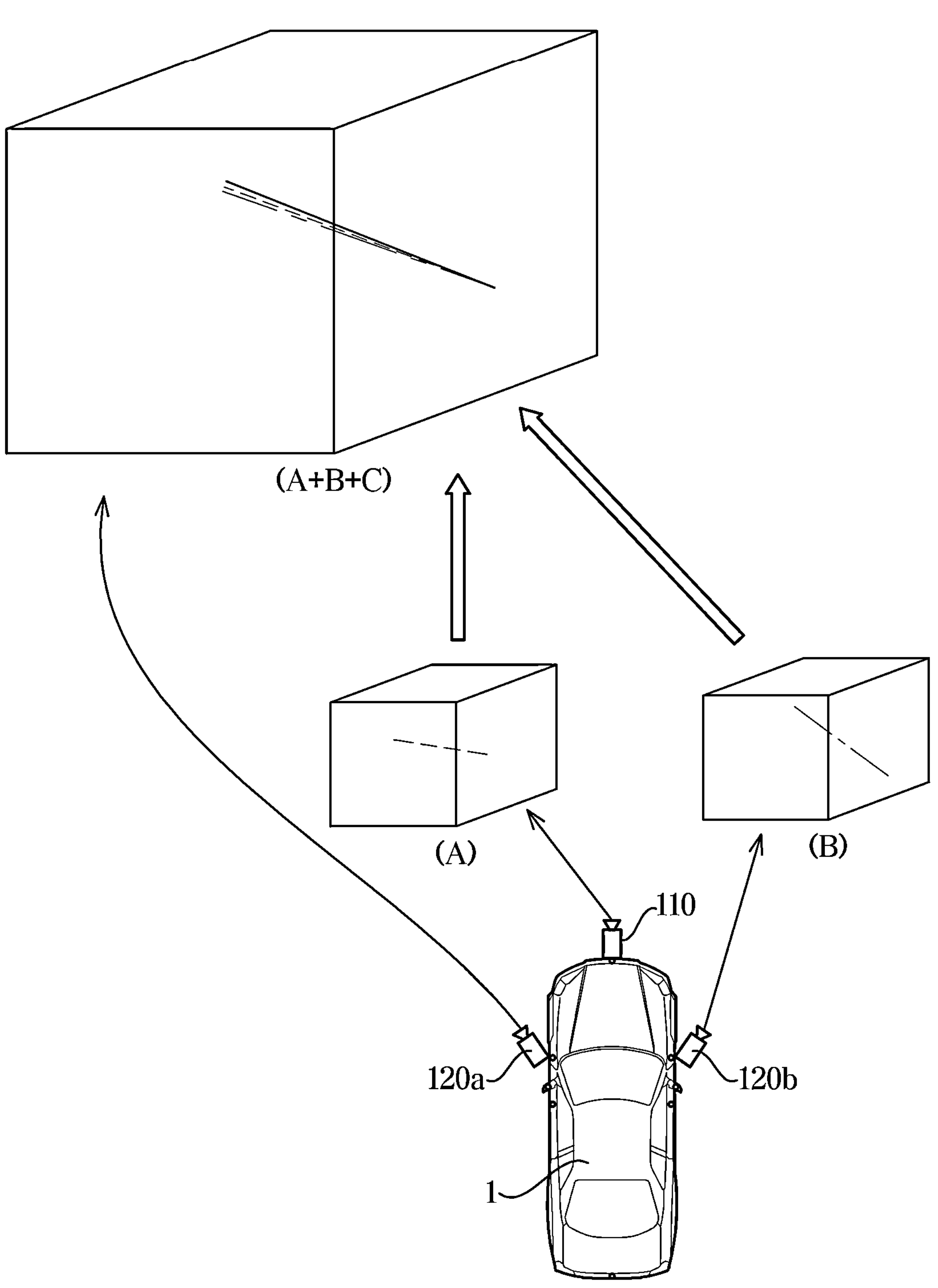
FIG. 8 illustrates a process of fusing 3D data acquired by multi-cameras.

FIG. 8 illustrates a process of fusing 3D data acquired by multi-cameras.

The 3D straight lines obtained by the cameras with respect to one object may be differently represented in the 3D coordinate system. For example, the 3D straight line A obtained by the front camera 110 and the 3D straight line B obtained by the frontward right camera **120*b*** are different in slope and intersection with respect to the same coordinate system.

As described above, the parallax information between the cameras is stored in the memory 220 of the vehicle 1, and thus used in merging the 3D straight lines in one coordinate system. For example, the controller 200 may merge the 3D straight line A obtained by the front camera 110 and the 3D straight line B obtained by the frontward right camera **120*b* with the 3D straight line C obtained by the frontward left camera 120*a***. Thus, it is possible to increase learning data about the same object, and correctly recognize the same object as one object.

According to an embodiment, the controller 200 may recognize an object in a first image and an object in a second image as the same object when a difference between the 3D straight line of the object recognized in the first image and the 3D straight line of the object recognized in the second image matches the parallax information stored in the memory 220.

Meanwhile, the above-described embodiments, including the controller, may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium may include all types of recording media storing data readable by a computer system. Examples of the computer-readable recording medium include a Read-Only Memory (ROM), a Random-Access Memory (RAM), a magnetic tape, a magnetic disk, a flash memory, an optical data storage device, or the like.

According to an aspect of the disclosure, the AOC and the VDC are simplified, thereby increasing the reliability of estimating the distance from the object.

Although embodiments of the disclosure have been shown and described, it should be appreciated by those having ordinary skill in the art that changes may be made in these embodiments without departing from the principles and spirit of the disclosure, the scope of which is defined in the claims and their equivalents.

What is claimed is:

1. A vehicle comprising:

a first camera configured to obtain a first image;

a second camera configured to obtain a second image captured in a different field of view from the first camera; and a controller configured to obtain a distance between the vehicle and an object by processing images obtained by the first and second cameras, recognize a first object in a frame of the image, obtain a height of the first object, an aspect ratio of the first object, and a distance from the first object, assign the height, the aspect ratio, and the distance to 3D coordinate values, generate a 3D straight line based on a plurality of 3D coordinate values in each frame, store a characteristic relationship between the recognized first object and the 3D straight line in a memory, obtain a height of a second object and an aspect ratio of the second object by image processing, upon recognizing the second object of the same model as the first object through the multi-cameras, and estimate a distance from the second object based on the characteristic relationship, wherein the controller is configured to generate 3D coordinate values for each of a plurality of frames corresponding to the height, the aspect ratio, and the distance of the first object in a 3D Euclidean space, accumulate the generated 3D coordinate values, and fit the accumulated 3D coordinate values to the 3D straight line, and wherein the controller is configured to determine a necessity for automated online calibration (AOC) based on a first characteristic relationship for the first object and a second characteristic relationship for the second object, and process the AOC for the first image and second image based on the determined necessity for the AOC, and wherein the controller is configured to:

determine the height of the object, which is corrected considering that the camera is turned in a yawing direction, the aspect ratio of the object, and the distance from the object, and input the height of the object, the aspect ratio of the object, and the distance from the object into a predetermined learning model to generate coordinate points corresponding to three vehicle features in the 3D Euclidean space and to fit the generated coordinate points to the 3D straight line.

2. The vehicle of claim 1, further comprising an inertial measurement unit (IMU) configured to determine a posture and acceleration state of the vehicle, wherein the controller is further configured to determine a necessity for vehicle dynamic compensation (VDC) based on a frequency output from the IMU.

3. The vehicle of claim 2, wherein the controller is further configured to control the memory not to store the characteristic relationship for the first object, upon the frequency output from the IMU, when the magnitude of the frequency output is higher than or equal to a predetermined value.

4. The vehicle of claim 2, wherein the controller is further configured to control the memory to store the characteristic relationship for the first object, upon the frequency output from the IMU, when the magnitude of the frequency output is lower than a predetermined value.

5. The vehicle of claim 1, wherein the controller is further configured to calculate a gradient variation between a gradient of a 3D straight line equation based on the first characteristic relationship and a gradient of a 3D straight line equation based on the second characteristic relationship, and to determine an amount of calibration for the AOC based on the gradient variation.

6. The vehicle of claim 1, wherein, upon any one of the first camera or the second camera being turned in a yawing direction, the controller is further configured to correct the height of the first object based on a calibration result value stored in the memory, and to store the characteristic relationship for the first object based on the corrected height.

7. The vehicle of claim 1, wherein the memory is further configured to store parallax information between the first camera and the second camera, and the controller is further configured to recognize an object in the first image and an object in the second image as the same image, upon the parallax information matching a difference between a 3D straight line of the object recognized in the first image and a 3D straight line of the object recognized in the second image.

8. A method of controlling a vehicle with multiple cameras including a first camera and a second camera, the method comprising:

obtaining a first image through the first camera;

obtaining a second image captured in a different field of view from the first camera through the second camera;

recognizing a first object in a frame of the image;

obtaining a height of the first object, an aspect ratio of the first object, and a distance from the first object;

assigning the height, the aspect ratio, and the distance to 3D coordinate values;

generating a 3D straight line based on a plurality of 3D coordinate values in each frame;

storing a characteristic relationship between the recognized first object and the 3D straight line in a memory;

obtaining a height of a second object and an aspect ratio of the second object by image processing, upon recognizing the second object of the same model as the first object through the multiple cameras; and estimating a distance from the second object based on the characteristic relationship, wherein the generating of the 3D straight line includes;

determining the height of the object, which is corrected considering that the camera is turned in a yawing direction, the aspect ratio of the object, and the distance from the object; and inputting the height of the object, the aspect ratio of the object, and the distance from the object into a predetermined learning model to generate coordinate points corresponding to three vehicle features in the 3D Euclidean space and to fit the generated coordinate points to the 3D straight line, and wherein the estimating of the distance includes determining a necessity for automated online calibration (AOC) based on a first characteristic relationship for the first object and a second characteristic relationship for the second object, and processing the AOC for the first image and second image based on the determined necessity for the AOC.

9. The method of claim 8, further comprising determining a necessity for vehicle dynamic compensation (VDC) based on a frequency output from an inertial measurement unit (IMU).

10. The method of claim 9, wherein the determining of the necessity for the VDC comprises controlling the memory not to store the characteristic relationship for the first object, upon the frequency output from the IMU, when the magnitude of the frequency output is higher than or equal to a predetermined value.

11. The method of claim 9, wherein the determining of the necessity for the VDC comprises controlling the memory to store the characteristic relationship for the first object, upon the frequency output from the IMU, when the magnitude of the frequency output is lower than a predetermined value.

12. The method of claim 8, wherein the determining of the necessity for the AOC comprises:

calculating a gradient variation between a gradient of a 3D straight line equation based on the first characteristic relationship and a gradient of a 3D straight line equation based on the second characteristic relationship; and determining an amount of calibration for the AOC based on the gradient variation.

13. The method of claim 8, wherein, upon any one of the first camera or the second camera being turned in a yawing direction, the determining of the necessity for the AOC comprises:

correcting the height of the first object based on a calibration result value stored in the memory; and storing the characteristic relationship for the first object based on the corrected height.

14. The method of claim 8, further comprising recognizing an object in the first image and an object in the second image as the same image, upon parallax information matching a difference between a 3D straight line of the object recognized in the first image and a 3D straight line of the object recognized in the second image, wherein the parallax information comprises a geometrical relationship between the first camera and the second camera.

* * * * *